United States Patent

Kayane et al.

[11] 4,378,313
[45] Mar. 29, 1983

[54] REACTIVE YELLOW DYE HAVING BOTH MONOCHLOROTRIAZINYL AND VINYLSULFONE TYPE REACTIVE GROUPS

[75] Inventors: Yutaka Kayane, Moriguchi; Masaki Sunami, Toyonaka; Yasuo Tezuka, Ibaraki, all of Japan

[73] Assignee: Sumitomo Chemical Company, Limited, Osaka, Japan

[21] Appl. No.: 153,633

[22] Filed: May 27, 1980

[30] Foreign Application Priority Data

Jun. 1, 1979 [JP] Japan .................. 54-69127
Jul. 11, 1979 [JP] Japan .................. 54-88502
Dec. 20, 1979 [JP] Japan .................. 54-166705
Dec. 20, 1979 [JP] Japan .................. 54-166706

[51] Int. Cl.³ .............. C09B 62/085; D06P 1/382; D06P 3/66
[52] U.S. Cl. .................. 260/153; 260/194; 260/196; 260/458 C; 260/508; 564/440
[58] Field of Search ......................... 260/153

[56] References Cited

U.S. PATENT DOCUMENTS 3,223,470 12/1965 Boedeker et al. .......... 260/153 X

Primary Examiner—Floyd D. Higel
Attorney, Agent, or Firm—Stevens, Davis, Miller & Mosher

[57] ABSTRACT

The compounds represented, in the form of free acid, by the following general formula (I):

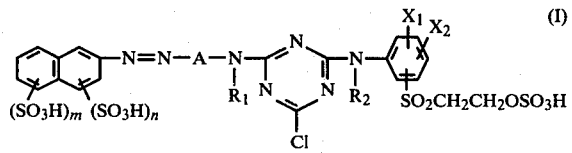

(wherein A is

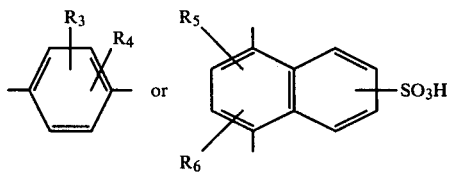

(wherein $R_3$ and $R_4$ are each hydrogen or a methyl, ethyl, methoxy, ethoxy, acetylamino, propionylamino, benzoylamino or ureido group, and $R_5$ and $R_6$ are each hydrogen or a methyl or methoxy group), $R_1$ and $R_2$ are each hydrogen or a methyl, ethyl or sulfomethyl group, $X_1$ and $X_2$ are each hydrogen, chlorine or a methyl, methoxy, carboxyl or sulfonic acid group, m is a number of 0, 1 or 2, and n is a number of 1 or 2, provided that the sum of m and n is 1, 2 or 3).

These compounds are capable of dyeing cellulose fibers in yellow with excellent color fastness to hypochlorite, light, perspiration and sunlight and high acid stability.

5 Claims, No Drawings

REACTIVE YELLOW DYE HAVING BOTH MONOCHLOROTRIAZINYL AND VINYLSULFONE TYPE REACTIVE GROUPS

This invention relates to the compounds for dyeing cellulose fiber in yellow, a process for preparing such compounds and a dyeing method using said compounds. More particularly, the invention relates to dyes which are represented, in the form of free acid, by the following general formula (I):

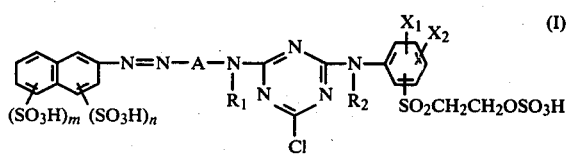

[wherein A is

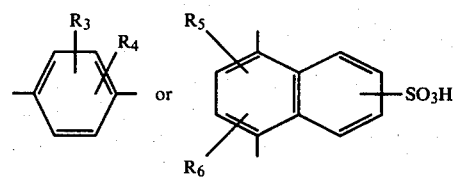

(where $R_3$ and $R_4$ are each hydrogen or a methyl, ethyl, methoxy, ethoxy, acetylamino, propionylamino, benzoylamino or ureido group, and $R_5$ and $R_6$ are each hydrogen or a methyl or methoxy group), $R_1$ and $R_2$ are each hydrogen or a methyl, ethyl or sulfomethyl group, $X_1$ and $X_2$ are each hydrogen, chlorine or a methyl, methoxy, carboxyl or sulfonic acid group, m is a number of 0, 1 or 2, and n is a number of 1 or 2, provided that the sum of m and n is 1, 2 or 3.] a process for preparing such dyes and a method of dyeing cellulose fiber by using these dyes.

It is known that the dyes having a $\beta$-sulfatoethyl sulfonyl group, or so-called vinyl sulfone type reactive dyes, are usable for dyeing textile materials. However, the textile materials dyed with the azo type yellow reactive dyes having a $\beta$-sulfatoethyl sulfonyl group have generally low color fastness to hypochlorite and often present the problem of fading due to chlorine contained in tap water. Therefore, the advent of a yellow reactive dye with excellent color fastness to hypochlorite has been strongly desired.

Yellow dyes having a monochlorotriazinyl group, which is another typical reactive group different from said $\beta$-sulfatoethyl sulfonyl group, are also known but these reactive dyes usually require a high temperature for dyeing and also lack dyeability for exhaustion dyeing, and further the fabrics dyed with these dyes have poor acid stability. Thus, these dyes are far from satisfactory for practical use.

Generally, the reactive dyes which have dyeability for exhaustion dyeing have poor wash-off properties, so that a great deal of labor and time as well as large volume of washing water are required for removing unfixed dye during soaping.

In view of the above, the present inventors have made further studies in search of a vinyl sulfone type yellow reactive dye having excellent color fastness to hypochlorite, dyeability for exhaustion dyeing and wash-off properties and found as a result that the dyes represented by the above-shown general formula (I), namely the monoazo dyes having a $\beta$-sulfatoethyl sulfonyl group and a monochlorotriazinyl group as reactive group, are capable of providing the yellow dyed fabrics with excellent color fastness to hypochlorite. It was also revealed that the dyes of this invention can eliminate said defects of the reactive dyes having a monochlorotriazinyl group.

The cellulose fibers to which the dyes of this invention can be applied include both natural and regenerated cellulose fibers such as cotton, hemp, viscose rayon, viscose staple fiber, etc.

Exhaustion dyeing using a dye of this invention can be accomplished at a relatively low temperature in a dye bath in which Glauber's salt or common salt has been added in the presence of an acid binder such as sodium carbonate, sodium tertiary phosphate, sodium hydroxide, etc. Dyeing according to a printing method is also possible.

The dyes of this invention can be produced, for example, by the following process:

A 2-aminonaphthalenesulfonic acid of the general formula (II):

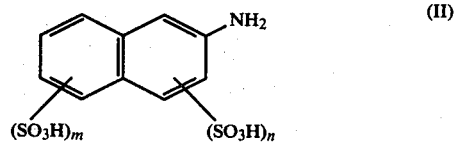

(wherein m and n are as defined above) is diazotized and coupled with an amino compound of the general formula (III):

(wherein A and $R_1$ are as defined above) to obtain a monoazo compound of the general formula (IV):

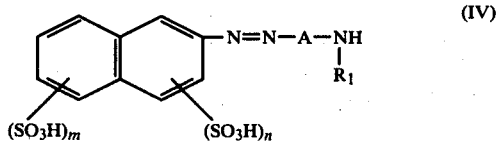

(wherein A, $R_1$, m and n are as defined above) and this monoazo compound is condensed primarily with cyanuric chloride to obtain a dichlorotriazinyl compound. Then this compound is subjected to secondary condensation with an aniline compound of the general formula (V):

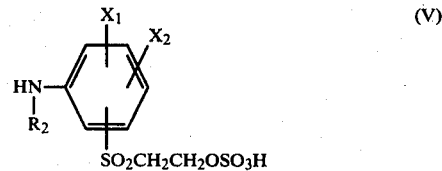

(wherein $R_2$, $X_1$ and $X_2$ are as defined above) to obtain a dye of the general formula (I).

In another method, an aniline compound of the general formula (V) is condensed primarily with cyanuric chloride and then a monoazo compound of the general formula (IV) is condensed therewith secondarily to obtain a dye of the general formula (I).

It is also possible to obtain a dye of the general formula (I) by conducting the above-said reaction by using a β-hydroxyethylsulfonyl compound of the general formula (VI):

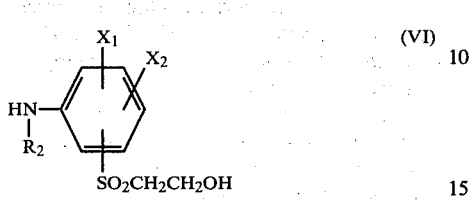

(wherein $R_2$, $X_1$ and $X_2$ are as defined above) instead of the aniline compound of the general formula (V) and esterifying the reaction product in sulfuric acid.

The following may be cited as the examples of the compounds of the general formula (II):
2-aminonaphthalene-1-sulfonic acid
2-aminonaphthalene-1,5-disulfonic acid
2-aminonaphthalene-4,8-disulfonic acid
2-aminonaphthalene-1,7-disulfonic acid
2-aminonaphthalene-1,3,7-trisulfonic acid
2-aminonaphthalene-3,6,8-trisulfonic acid
2-aminonaphthalene-4,6,8-trisulfonic acid
2-aminonaphthalene-1,5,7-trisulfonic acid Examples of the compounds of the general formula (III) are:
m-toluidine
3-ethylaniline
2,5-xylidine
2-ethyl-5-methylaniline
2-methoxy-5-methylaniline
2-methoxy-5-ethylaniline
2-ethoxy-5-methylaniline
2-ethoxy-5-ethylaniline
3-aminoacetoanilide
3-amino-4-methylacetoanilide
3-amino-4-ethylacetoanilide
3-amino-4-methoxyacetoanilide
3-amino-4-ethoxyacetoanilide
3-aminophenylurea
3-hydroxyacetylaminoaniline
3-propionylaminoaniline
2,5-dimethoxyaniline
1-aminonaphthalene-6-sulfonic acid
1-aminonaphthalene-7-sulfonic acid
1-aminonaphthalene-8-sulfonic acid
1-amino-2-methylnaphthalene-6-sulfonic acid
1-amino-2-methylnaphthalene-7-sulfonic acid
1-amino-2-methoxynaphthalene-6-sulfonic acid
1-amino-2-methoxynaphthalene-7-sulfonic acid and the N-methyl derivatives, N-ethyl derivatives and N-sulfomethyl derivatives of the above-cited compounds.

Examples of the compounds of the general formula (V), are:
1-aminobenzene-3-β-sulfatoethylsulfone
1-aminobenzene-4-β-sulfatoethylsulfone
1-amino-2-methoxybenzene-5-β-sulfatoethylsulfone
1-amino-4-methoxybenzene-3-β-sulfatoethylsulfone
1-amino-2-methylbenzene-5-β-sulfatoethylsulfone
1-amino-4-methylbenzene-3-β-sulfatoethylsulfone
1-amino-2-chlorobenzene-4-β-sulfatoethylsulfone
1-amino-4-chlorobenzene-3-β-sulfatoethylsulfone
1-amino-2-sulfobenzene-4-β-sulfatoethylsulfone
1-amino-2-sulfobenzene-5-β-sulfatoethylsulfone
1-amino-2-carboxybenzene-4-β-sulfatoethylsulfone
1-amino-2-methoxy-5-methylbenzene-4-β-sulfatoethylsulfone
1-amino-2,5-dimethoxy-4-β-sulfatoethylsulfone and the N-methyl derivatives, N-ethyl derivatives and N-sulfomethyl derivatives of the above-said compounds.

The thus obtained dyes of this invention have excellent color fastness to hypochlorite, light, perspiration and sunlight. It is particularly noteworthy that they are suited for exhaustion dyeing and also excellent in wash-off properties.

Further, the dyes of this invention are capable of level dyeing, have a wide range of dyeing temperatures and are minimally affected by the amount of inorganic salt used and bath ratio, i.e. they have good color reproducibility.

Among the known dyes analogous to those of the present invention are, for example, the monochlorotriazine type yellow reactive dyes which, in the form of free acids, which are represented by the following formulae:

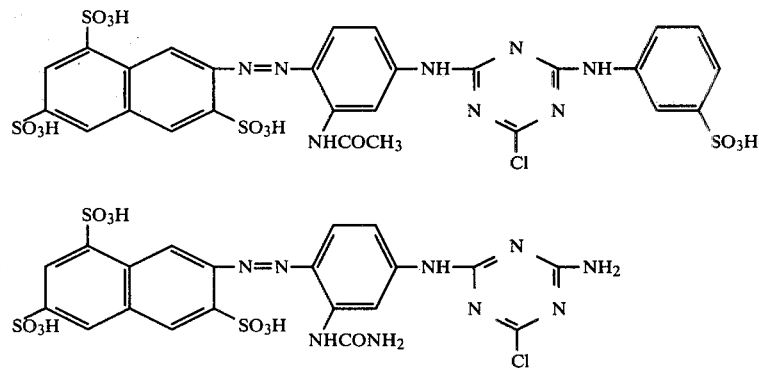

(Japanese Patent Publication No. 2634/1964) and

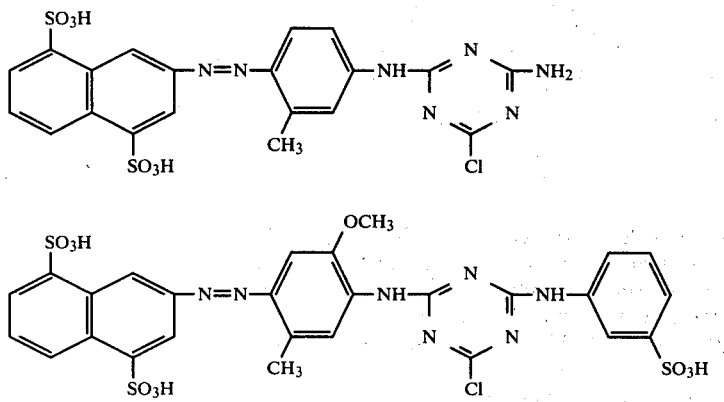

(Japanese Patent Publication No. 10628/1960). These dyes, however, require a high temperature for dyeing and also lack exhaustion dyeing ability, so that when used for dip dyeing, they cannot produce a desired color density. Also, the dyed fabrics are poor in acid stability and vulnerable to change in quality with time.

Japanese Patent Publication No. 18184/1964 shows the yellow reactive dyes represented by the following formulae:

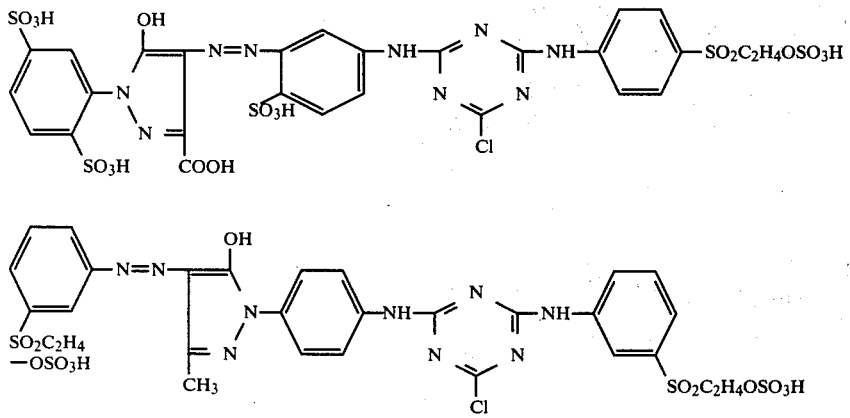

These dyes are very low in color fastness to hypochlorite, which is rated as low as 1st grade according to the ISO standards, and hence they are of little practical value.

Color fastness to hypochlorite of the dyes according to this invention is rated as 3rd to 4th grade in the ISO standards, and in view of popular use of the hypochlorite bleaching agents for laundry at general households in these days, the dyes of this invention having excellent color fastness to hypochlorite are of considerable merit. As for color fastness to perspiration and sunlight which has become a serious concern with spread of sportswear in recent years, the dyes of this invention also have excellent color fastness to perspiration and sunlight (3rd to 5th grade) as well as fastness to light (6th to 7th grade), which adds to the practical value of the dyes of this invention. The conventional reactive dyes involved the problem that the textile materials dyed therewith would be affected by acidic gas or other matters in the air and lowered in color fastness with the lapse of time, but the dyes of this invention have eliminated such problem, too. The fabrics dyed with the dyes of this invention show high acid stability (4th to 5th grade) (as tested by immersing the dyed fabric in 1% acetic acid for 30 minutes and then subjecting it to a 6-hour treatment under the conditions of $37\pm2°$ C. and 125 g/cm$^2$ by using a perspirometer).

Further, the dyes of this invention show a high rate of exhaustion and fixing in exhaustion dyeing, allowing production of dyed goods with high color density. They are also distinguished by their excellent wash-off properties, easy removability of unfixed dye and by leaving a very limited amount of residual dye in the dye bath, which provides the dyes of this invention with an advantage in respect of waste water treatment, too.

Moreover, the dyes of this invention are usable within a wide range of dyeing temperatures, irrespectively of the kind of alkali agents, the amount of inorganic salts used and bath ratio in exhaustion dyeing, and are capable of dyeing fabrics with extremely high reproducibility.

The invention is further described below by way of the examples thereof. All "parts" are by weight unless othwerwise noted. $\lambda_{max}$ of dye was measured in aqueous medium.

EXAMPLE 1-(a)

0.3 parts of a dye of the formula (1):

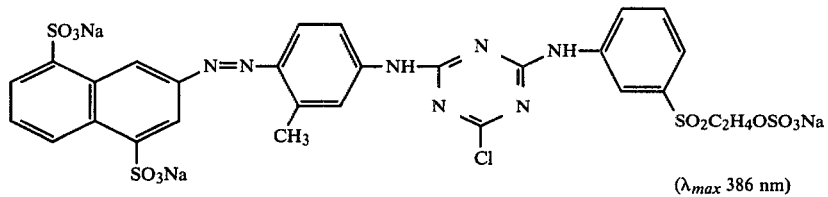

(1)

($\lambda_{max}$ 386 nm)

were dissolved in 200 parts of water, to this solution 20 parts of Glauber's salt and 10 parts of cotton were added and then heated to 50° C. 30 minutes after, 4 parts of sodium carbonate were further added to the mixed solution. Dyeing was performed with this dye solution at said temperature for one hour.

After completion of dyeing, the dyed stuff was washed with water and then subjected to soaping to obtain a high-density yellow dyed fabric with excellent color fastness to various factors, particularly color fastness to hypochlorite. It also showed excellent color reproducibility. (Color fastness to hypochlorite: 4th grade (ISO standards); color fastness to perspiration and sunlight: 4th grade; exhaustion rate: 95%; fixing rate: 85%).

The above-said dyeing operation was repeated by using the dyes of the following formulae (2) and (3) to obtain the yellow dyed fabrics with excellent color fastness to hypochlorite.

stirred at the same temperature for 30 minutes. After removing excess nitrous acid, said solution was further supplied with a solution containing 2.3 parts of concentrated hydrochloric acid and 2.1 parts of m-toluidine in 20 parts of water and stirred at 0°-10° C. for 5 hours. Then this solution was adjusted to pH 3-5, and after completing coupling, the pH was raised to 8 to dissolve the products, followed by addition of 20 parts of sodium chloride to reprecipitate the crystals. The obtained crystals were subjected to suction filtration and washing and again dissolved in 100 parts of water to adjust the pH to 6-7. This solution was added with 3.3 parts of cyanuric chloride and stirred at 20°-25° C. for 5 hours while controlling the pH at 5-6 by using a 20% aqueous solution of sodium carbonate. The mixed solution was then further supplied with 5.6 parts of 1-aminobenzene-3-β-hydroxyethylsulfonesulfuric ester, heated to 40° C. and stirred at the same temperature for 5 hours while controlling the pH at 5-6 by using a 20% aqueous solu-

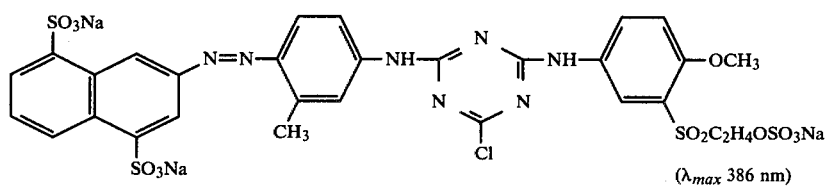

(2)

($\lambda_{max}$ 386 nm)

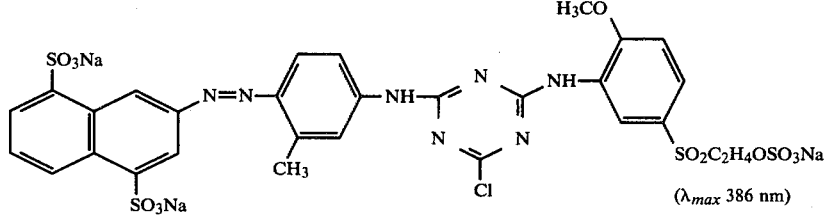

(3)

($\lambda_{max}$ 386 nm)

EXAMPLE 1-(b)

(Synthesis of the dye (1) of Example 1-(a))

The above-said dye (1) was synthesized in the following way. A solution containing 6.1 parts of 2-aminonaphthalene-4,8-disulfonic acid and 4.1 parts of concentrated hydrochloric acid in 100 parts of water was cooled to 0°-10° C., followed by pouring thereinto a solution formed by dissolving 1.4 parts of sodium nitrite in 3.3 parts of water, and the mixed solution was tion of sodium carbonate. This solution was supplied with 20 parts of sodium chloride to precipitate the crystals and the latter was subjected to suction filtration, washing and drying at 60° C. to obtain the dye (1).

EXAMPLE 2

0.3 parts of a dye of the following formula (4):

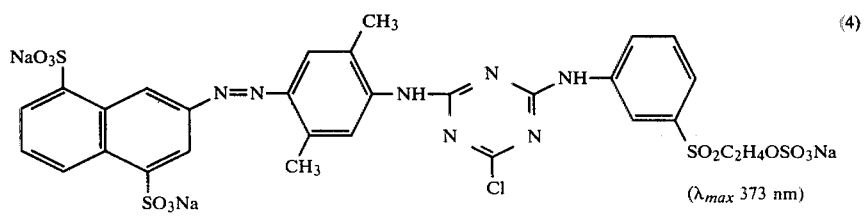

(4)

($\lambda_{max}$ 373 nm)

(obtained in the same way as Example 1-(b) but by using 2,5-dimethylaniline instead of m-toluidine) were dissolved in 200 parts of water, and the solution was supplied with 20 parts of Glauber's salt and 10 parts of cotton and heated to 50° C. 20 minutes later, it was further supplied with 3 parts of sodium tertiary phosphate. Dyeing was carried out by using this solution at the same temperature for one hour, and after completion of dyeing, the dyed stuff was subjected to washing with water and soaping to obtain a yellow dyed fabric having excellent color fastness to hypochlorite and equal dyeing properties to those of the dye of the formula (1) shown in Example 1-(a).

When dyeing was performed likewise by using the dyes of the following formulae (5) and (6), yellow dyed fabrics were obtained with excellent color fastness to hypochlorite.

(obtained after the manner of Example 1-(b) by using 2-methoxy-5-methylaniline instead of m-toluidine) were dissolved in 200 parts of water, this solution being then supplied with 20 parts of Glauber's salt and 10 parts of cotton and heated to 50° C., and after the lapse of 20 minutes, 4 parts of sodium carbonate were added. By using this dye solution, dyeing was performed at the same temperature for one hour, followed by washing with water and soaping to obtain a high-density yellow dyed fabric with excellent fastness properties, particularly excellent color fastness to hypochlorite, as well as good color reproducibility. (Color fastness to hypochlorite: 4th-5th grade (ISO standards); color fastness to perspiration and sunlight: 4th-5th grade; exhaustion rate: 99%; fixing rate: 93%).

By performing similar dyeing by using the dyes of the following formulae (8) and (9), yellow dyed fabrics

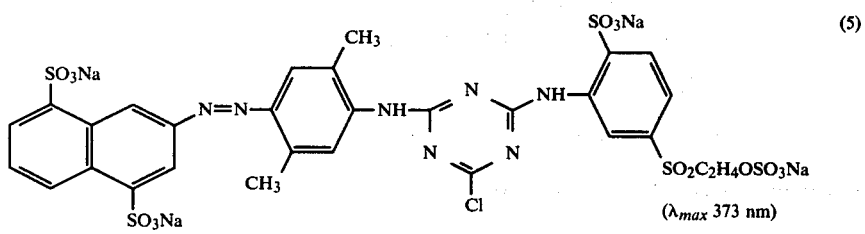

(5)

($\lambda_{max}$ 373 nm)

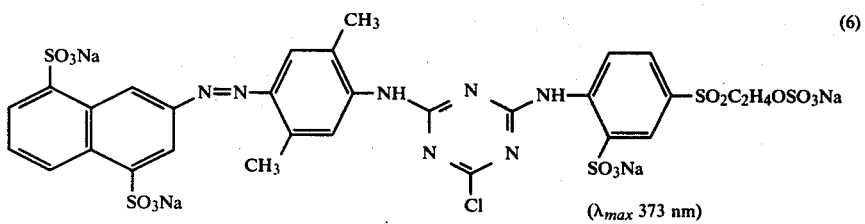

(6)

($\lambda_{max}$ 373 nm)

EXAMPLE 3

0.3 parts of a dye of the formula (7):

were obtained with excellent color fastness to hypochlorite.

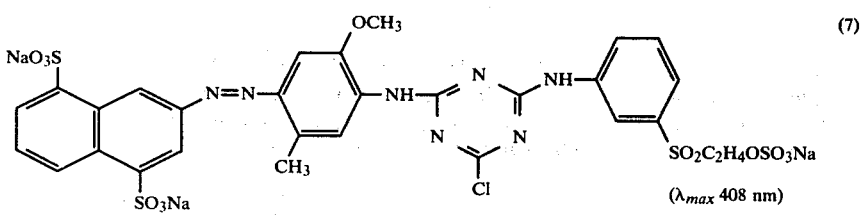

(7)

($\lambda_{max}$ 408 nm)

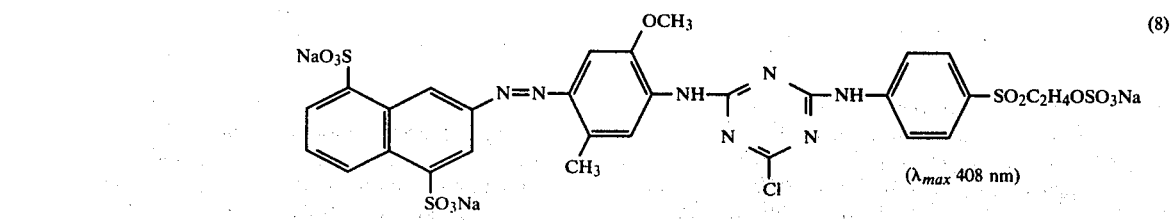

(8)

($\lambda_{max}$ 408 nm)

-continued

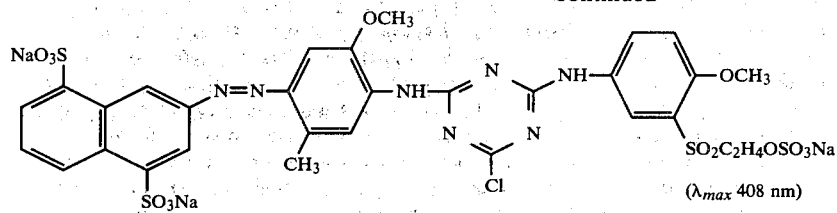

($\lambda_{max}$ 408 nm)

EXAMPLE 4

0.3 part of a dye of the following formula (10):

When dyeing was performed in a similar way by using the dyes of the following formulae (11) and (12), yellow dyed fabrics were obtained with excellent color fastness to hypochlorite.

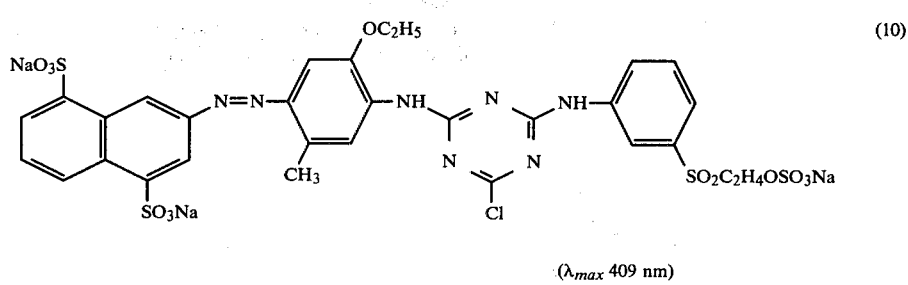

($\lambda_{max}$ 409 nm)

(obtained in the same manner as Example 1-(b) by using

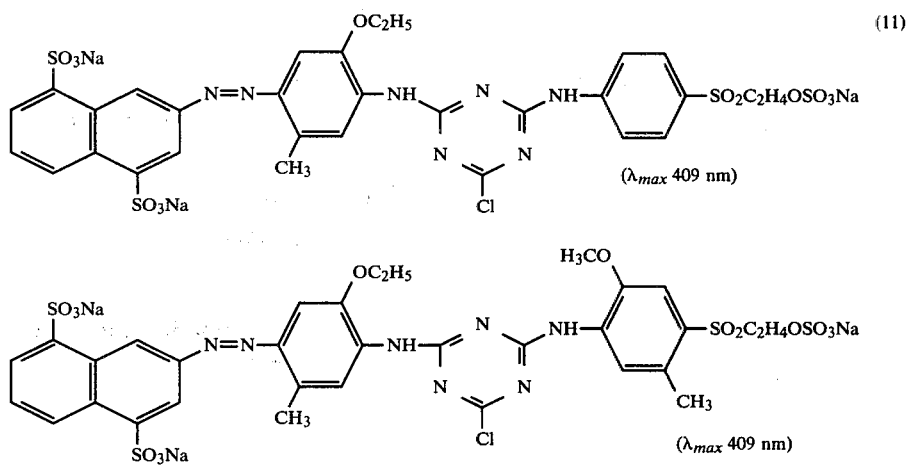

($\lambda_{max}$ 409 nm)

($\lambda_{max}$ 409 nm)

2-ethoxy-5-methylaniline instead of m-toluidine) were dissolved in 200 parts of water, followed by addition of 20 parts of Glauber's salt and 10 parts of cotton and heating to 60° C., and 20 minutes later, 3 parts of sodium tertiary phosphate were further added. Dyeing was performed by using this dye solution at said temperature for one hour, and after completion of dyeing operation, washing with water and soaping were performed to obtain a yellow dyed fabric with excellent color fastness to hypochlorite and other dyeing properties same as those of the dye of the formula (7) in Example 3.

EXAMPLE 5-(a)

The dye solution was prepared and dyeing was performed in the same way as Example 1-(a) by using a dye of the following formula (13):

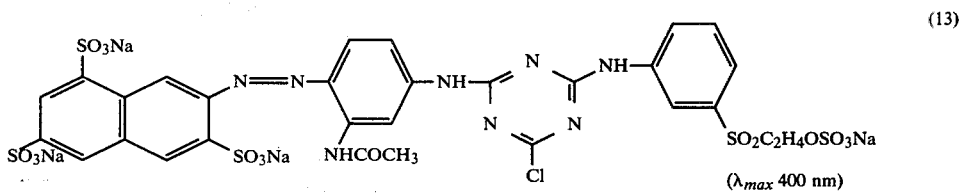

($\lambda_{max}$ 400 nm)

and a yellow dyed fabric was obtained with excellent color fastness, particularly, to hypochlorite and with good reproducibility. (Color fastness to hypochlorite: 3-4th grade (ISO standards); color fastness to perspiration and sunlight: 5th grade).

Similar dyeing operation conducted by using the dyes (14), (15), (16) and (17) of the formulae shown in the following table, which have components of formula (IV) and formula (V) or (VI), gave yellow dyed fabrics having good color fastness to hypchlorite.

| | General formula (IV) | General formula (V) or (VI) | $\lambda_{max}$ (nm) |
|---|---|---|---|
| (14) | SO₃Na, SO₃Na, SO₃Na naphthalene—N=N—phenyl(NHCOCH₃)—NH₂ | OCH₃, NH₂—phenyl—SO₂C₂H₄OSO₃Na | 400 |
| (15) | " | NH₂—phenyl(OCH₃)—SO₂C₂H₄OSO₃Na | 400 |
| (16) | " | OCH₃, NH₂—phenyl—SO₂C₂H₄OSO₃Na, OCH₃ | 400 |
| (17) | " | NH₂—phenyl(SO₃Na)—SO₂C₂H₄OSO₃Na | 400 |

EXAMPLE 5-(b)

(Synthesis of the dye (13) of Example 5-(a))

8.5 parts of a disodium 2-aminonaphthalene-3,6,8-trisulfonate was added and dissolved in 100 parts of water, with the pH of the solution being adjusted to 8 with sodium hydroxide. This solution was supplied with 1.4 parts of sodium nitrite, and after cooling the solution to 0°-5° C., 6.1 parts of concentrated hydrochloric acid were poured thereinto and the mixed solution was stirred at the same temperature for 30 minutes. After removing excess nitrous acid, this pasty solution was added at 0°-5° C. to a solution formed by dissolving 3.3 parts of m-acetylaminoaniline in 80 parts of water. The pH of this solution was adjusted to 3-5, and after coupling had been completed, pH was raised to 8 to dissolve the products. This solution was supplied with 4.1 parts of cyanuric chloride and stirred at 20°-25° C. for 5 hours while controlling the pH at 5-6 by using a 20% aqueous solution of sodium carbonate. The solution was supplied with 6.8 parts of a 1-aminobenzene-3-β-hydroxyethylsulfonesulfuric ester, heated to 40° C. and stirred at this temperature for 5 hours while controlling the pH at 5-6 by using a 20% aqueous solution of sodium carbonate. This solution was supplied with 25 parts of sodium chloride to precipitate the crystals and these crystals were subjected to suction filtration, washing and drying at 60° C. to obtain the dye (13).

EXAMPLE 6

The dyeing operation and after-treatment of Example 1-(a) were repeated by using a dye of the following formula (18):

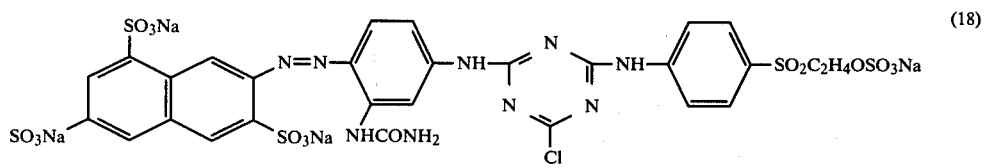

($\lambda_{max}$ 415 nm)

(obtained after the manner of Example 5-(b) by using 3-aminophenylurea instead of m-acetylaminoaniline) to obtain a high-density yellow dyed fabric with excellent fastness properties, particularly color fastness to hypochlorite. Color reproducibility was also excellent. (Color fastness to hypochlorite: 4th grade; color fastness to perspiration and sunlight: 4-5th grade; exhaustion rate; 95%; fixing rate: 90%; acid stability: 5th grade).

Dyeing was performed likewise by using the dyes (19), (20), (21) and (22) having components of the general formulae (IV) and (V) or (VI) shown below to obtain yellow dyed fabrics with excellent color fastness to hypochlorite.

| | General formula (IV) | General formula (V) or (VI) | $\lambda_{max}$ (nm) |
|---|---|---|---|
| (19) | SO$_3$Na, SO$_3$Na, SO$_3$Na-naphthyl-N=N-(NHCONH$_2$)-phenyl-NH$_2$ | NH$_2$-phenyl-SO$_2$C$_2$H$_4$OSO$_3$Na | 415 |
| (20) | " | NH$_2$-phenyl(OCH$_3$, CH$_3$)-SO$_2$C$_2$H$_4$OSO$_3$Na | 415 |
| (21) | " | NH$_2$-phenyl(COONa)-SO$_2$C$_2$H$_4$OSO$_3$Na | 415 |
| (22) | " | NH$_2$-phenyl(Cl)-SO$_2$C$_2$H$_4$OSO$_3$Na | 415 |

EXAMPLE 7-(a)

The dyeing process and after-treatment of Example 1-(a) were repeated but by setting the dyeing temperature at 60° C. and using a dye represented by the following formula (23):

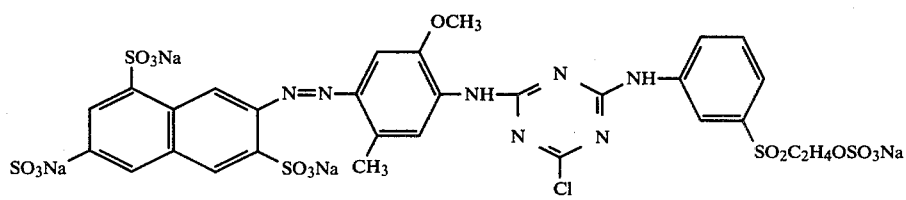

(23)

($\lambda_{max}$ 404 nm)

and a yellow dyed fabric was obtained with excellent color fastness to various elements, especially good color fastness to hypochlorite (3-4th grade, ISO standard).

Similar dyeing operations with the dyes (24), (25), (26) and (27) having components of the general formula (IV) and the general formula (V) or (VI) shown below produced yellow dyed fabrics with excellent color fastness to hypochlorite.

| | General formula (IV) | General formula (V) or (VI) | $\lambda_{max}$ (nm) |
|---|---|---|---|
| (24) | SO$_3$Na, SO$_3$Na, SO$_3$Na-naphthyl-N=N-(OCH$_3$, CH$_3$)-phenyl-NH$_2$ | NH$_2$-phenyl(OCH$_3$)-SO$_2$C$_2$H$_4$OSO$_3$Na | 404 |
| (25) | " | NH$_2$-phenyl(CH$_3$)-SO$_2$C$_2$H$_4$OSO$_3$Na | 404 |
| (26) | " | NH$_2$-phenyl(OCH$_3$, OCH$_3$)-SO$_2$C$_2$H$_4$OSO$_3$Na | 404 |

| | General formula (IV) | General formula (V) or (VI) | $\lambda_{max}$ (nm) |
|---|---|---|---|
| (27) | " | CH₃ — benzene with NH₂ and SO₂C₂H₄OSO₃Na | 404 |

EXAMPLE 7-(b)

(Synthesis of the dye (23) of Example 7-(a))

The synthesizing process of Example 5-(b) was repeated by using a solution formed by dissolving 3.5 parts of p-cresidine hydrochloride in 80 parts of water instead of using 3.3 parts of m-acetylaminoaniline as coupler to obtain the dye (23).

EXAMPLE 8

(obtained according to the method described in Example 7-(b) but by using m-toluidine instead of p-cresidine). As a result, a yellow dyed fabric was obtained with good fastness properties, especially excellent color fastness to hypochlorite (4-5th grade, ISO standard).

Similar dyeing operation conducted by using the dyes (29), (30), (31) and (32) having components of the general formula (IV) and the general formula (V) or (VI) shown below produced the yellow dyed fabrics with excellent color fastness to hypochlorite.

| | General formula (IV) | General formula (V) or (VI) | $\lambda_{max}$ (nm) |
|---|---|---|---|
| (29) | naphthalene with SO₃Na (×3), N=N, linked to benzene with NH₂ and CH₃ | NH₂—benzene—SO₂C₂H₄OSO₃Na | 384 |
| (30) | " | NH₂—benzene(OCH₃, CH₃)—SO₂C₂H₄OSO₃Na | 384 |
| (31) | " | NH₂—benzene(COONa)—SO₂C₂H₄OSO₃Na | 384 |
| (32) | " | NH₂—benzene(Cl)—SO₂C₂H₄OSO₃Na | 384 |

Dyeing and after-treatment were conducted in the same way as Example 1-(a) except that sodium carbonate was added 20 minutes after heating to 50° C. of the dye solution, by using a dye represented by the following formula (28):

EXAMPLE 9-(a)

The dyeing process and after-treatment of Example 1-(a) were repeated by using a dye represented by the following formula (33):

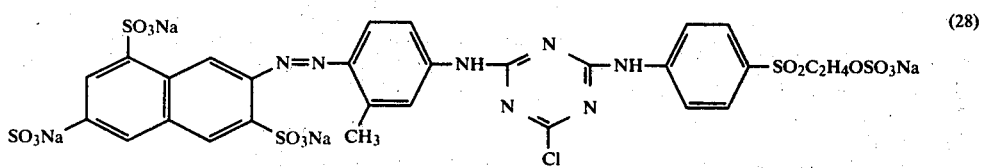

(28)

($\lambda_{max}$ 384 nm)

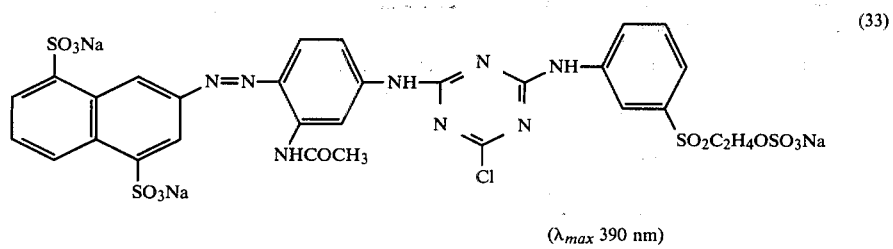

(33)

($\lambda_{max}$ 390 nm)

to obtain a yellow dyed fabric with excellent color fastness to various elements, especially color fastness to hypochlorite (3rd grade, ISO standard).

Dyeing was conducted likewise by using the dyes (34), (35), (36) and (37) having components of the general formula (IV) and the general formula (V) or (VI) shown below to obtain yellow dyed fabrics with excellent color fastness to hypochlorite.

tion of a 15% aqueous solution of sodium carbonate and then stirred for further 2 hours. Thereafter, a monoazo compound prepared from a diazonium salt of 6.1 parts of 2-aminonaphthalene-4,8-disulfonic acid and 3.0 parts of m-acetylaminoaniline was added thereto. Then, the mixture was heated to 40° C. while adjusting to pH 5–6 by adding a 15% aqueous solution of sodium carbonate, and maintained at the same temperature and the same

| | General formula (IV) | General formula (V) or (VI) | $\lambda_{max}$ (nm) |
|---|---|---|---|
| (34) | [naphthalene with SO$_3$Na, SO$_3$Na, N=N-phenyl(NHCOCH$_3$)-NH$_2$] | [phenyl with OCH$_3$, NH$_2$, SO$_2$C$_2$H$_4$OSO$_3$Na] | 390 |
| (35) | " | [phenyl with NH$_2$, Cl, SO$_2$C$_2$H$_4$OSO$_3$Na] | 390 |
| (36) | " | [phenyl with OCH$_3$, NH$_2$, SO$_2$C$_2$H$_4$OSO$_3$Na, OCH$_3$] | 390 |
| (37) | [naphthalene with SO$_3$Na, SO$_3$Na, N=N-phenyl(OCH$_3$, NHCOCH$_3$)-NH$_2$] | [phenyl with NH$_2$, SO$_2$C$_2$H$_4$OSO$_3$Na] | 410 |

EXAMPLE 9-(b)

(Synthesis of the dye (33) of Example 9-(a))

Into a solution of 0.1 part of nonionic surfactant in 100 parts of water, 3.7 parts of cyanuric chloride at 0°–5° C. were added and dispersed.

A solution of 5.6 parts of 1-aminobenzene-3-β-hydroxyethylsulfonesulfuric ester dissolved at pH 5–6 in 50 parts of water, was dropwise added into said dispersion at 0°–5° C. for one hour. After completion of the addition, the mixture was adjusted to pH 3 by addition of a 15% aqueous solution of sodium carbonate and then stirred for further 2 hours. Thereafter, a monoazo compound prepared from a diazonium salt of 6.1 parts of 2-aminonaphthalene-4,8-disulfonic acid and 3.0 parts of m-acetylaminoaniline was added thereto. Then, the mixture was heated to 40° C. while adjusting to pH 5–6 by adding a 15% aqueous solution of sodium carbonate, and maintained at the same temperature and the same pH for 5 hours. 25 Parts of sodium chloride were added thereto to precipitate crystals. The crystals were collected by suction filtration, washed and dried at 60° C. to obtain the dye (33).

EXAMPLE 10

Dyeing and after-treatment were carried out in the same way as Example 1-(a) except that the dye solution was heated to 60° C. and sodium carbonate was added 20 minutes thereafter, by using a dye represented by the following formula (38):

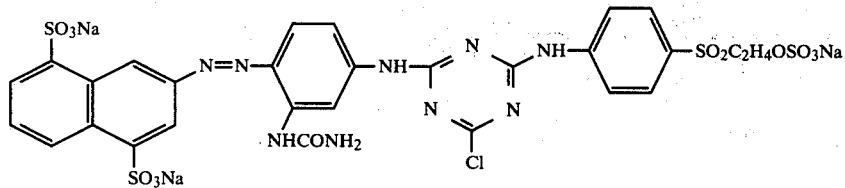

(38)

($\lambda_{max}$ 395 nm)

(obtained in the same way as described in Example 9-(b) but by using 3-aminophenylurea instead of m-acetylaminoaniline), and a yellow dyed fabric was obtained with excellent color fastness properties, especially admirable color fastness to hypochlorite (4th grade, ISO standard).

By performing a similar dyeing operation by using the dyes (39), (40), (41) and (42) having components of the general formula (IV) and the general formula (V) or (VI) shown below, yellow dyed fabrics were obtained having excellent color fastness to hypochlorite.

EXAMPLE 11

The dyeing operation and after-treatment of Example 1-(a) were repeated by adding sodium carbonate 20 minutes after heating of the dye solution and using a dye represented by the following formula (43):

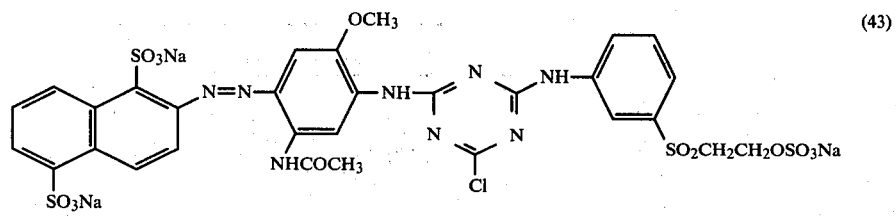

(43)

($\lambda_{max}$ 394 nm)

to obtain a yellow dyed fabric having excellent color fastness to various elements, especially high-grade color fastness to hypochlorite (3rd grade, ISO standard).

Similar dyeing operations with the dyes (44) and (45) having components the general formula (IV) and the general formula (V) or (VI) shown below produced the yellow dyed fabrics with excellent color fastness to hypochlorite.

| | General formula (IV) | General formula (V) or (VI) | $\lambda_{max}$ (nm) |
|---|---|---|---|
| (39) | ![SO3Na-naphthalene-N=N-phenyl(NHCONH2)-NH2, with SO3Na] | ![NH2-phenyl-SO2C2H4OSO3Na] | 395 |
| (40) | " | ![NH2-phenyl(OCH3)(CH3)-SO2C2H4OSO3Na] | 395 |
| (41) | " | ![NH2-phenyl(COONa)-SO2C2H4OSO3Na] | 395 |
| (42) | ![SO3Na-naphthalene-N=N-phenyl(NHCO-phenyl)-NH2, with SO3Na] | ![NH2-phenyl-SO2C2H4OSO3Na] | 392 |

| | General formula (IV) | General formula (V) or (VI) | $\lambda_{max}$ (nm) |
|---|---|---|---|
| (44) | SO3Na-naphthalene(SO3Na)-N=N-C6H2(OCH3)(NHCOCH3)-NH2 | NH2-C6H3(SO3Na)-SO2C2H4OSO3Na | 394 nm |
| (45) | SO3Na-naphthalene(SO3Na)-N=N-C6H3(NHCONH2)-NH2 | NH2-C6H4-SO2C2H4OSO3Na | 400 nm |

EXAMPLE 12-(a)

The process of Example 1-(a) was repeated for dyeing and after-treatment by using a dye represented by the following formula (46):

general formula (IV) and the general formula (V) or (VI) shown below, yellow dyed fabrics were obtained with excellent color fastness to hypochlorite.

| | General formula (IV) | General formula (V) or (VI) | $\lambda_{max}$ (nm) |
|---|---|---|---|
| (47) | SO3Na,SO3Na,SO3Na-naphthalene-N=N-C6H2(OCH3)(CH3)-NH2 | NH2-C6H4-SO2C2H4OSO3Na | 410 |
| (48) | SO3Na,SO3Na,SO3Na-naphthalene-N=N-C6H3(NHCONH2)-NH2 | H2N-C6H3(OCH3)-SO2C2H4OSO3Na | 415 |
| (49) | SO3Na,SO3Na,SO3Na-naphthalene-N=N-C6H2(OCH3)(NHCOCH3)-NH2 | H2N-C6H4-SO2C2H4OSO3Na | 425 |
| (50) | SO3Na,SO3Na,SO3Na-naphthalene-N=N-C6H2(CH3)(CH3)-NH2 | H2N-C6H3(OCH3)-SO2C2H4OSO3Na | 395 |

EXAMPLE 12-(b)

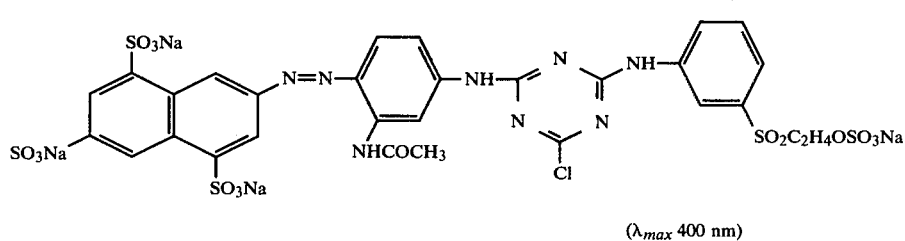

(46)

($\lambda_{max}$ 400 nm)

A yellow dyed fabric was obtained having excellent fastness properties, especially color fastness to hypochlorite (4th grade, ISO standard).

When similar dyeing was performed by using the dyes (47), (48), (49) and (50) having components of the (Synthesis of the dye (46) of Example 12-(a))

The same synthesizing process as Example 9-(b) was repeated except that 4.0 parts of 1-aminobenzene-3-β- hydroxyethylsulfone instead of 5.6 parts of 1-aminobenzene-3-β-hydroxyethylsulfonesulfuric ester and 7.7 parts of 2-aminonaphthalene-4,6,8-trisulfonic acid instead of 6.1 parts of 2-aminonaphthalene-4,8-disulfonic acid were used respectively.

Monochlorotriazinyl compound obtained therein was dissolved in 100 parts of 100% sulfuric acid at 20°-30° C. The solution was stirred at the same temperature for 2 hours and then was poured into 200 parts of ice. Crystals were precipitated therefrom by adding 30 parts of sodium chloride and collected by filtration. The crystals were added in 200 parts of water and dissolved by adjusting to pH 5-6 with sodium carbonate. By adding 40 parts of sodium chloride, the crystals were re-precipitated, and then, collected by suction filtration, washed and dried at 60° C. to obtain the dye (46).

EXAMPLE 13

Dyeing and after-treatment were carried out in the same manner as Example 1-(a) except that sodium carbonate was added 20 minutes after heating the dye solution to 60° C. by using a dye of the following formula (51):

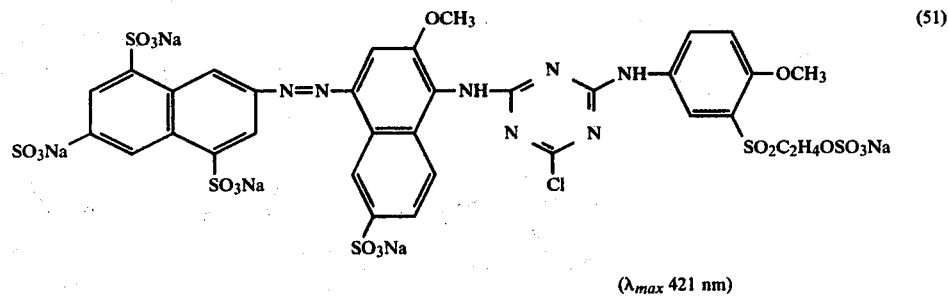

(λ$_{max}$ 421 nm)

A yellow dyed fabric was obtained having excellent color fastness to various elements, particularly color fastness to hypochlorite (3rd grade, ISO standard).

EXAMPLE 14-(a)

The process of Example 1-(a) was repeated by using a dye represented by the following formula (52):

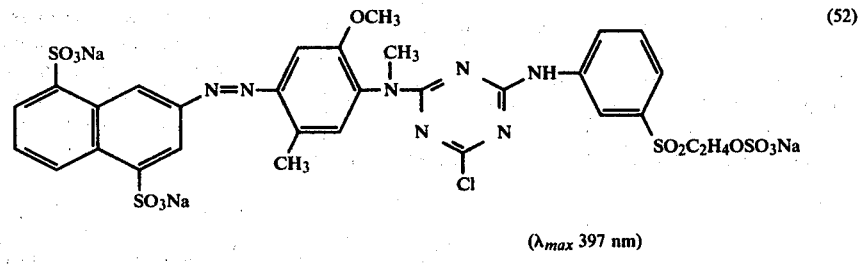

(λ$_{max}$ 397 nm)

to obtain a yellow dyed fabric with excellent color fastness to hypochlorite (4-5th grade, ISO standard).

When a similar dyeing operation was conducted by using the dyes (53), (54) and (55) having the following formulae:

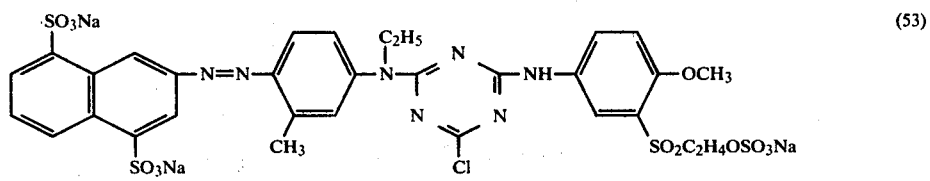

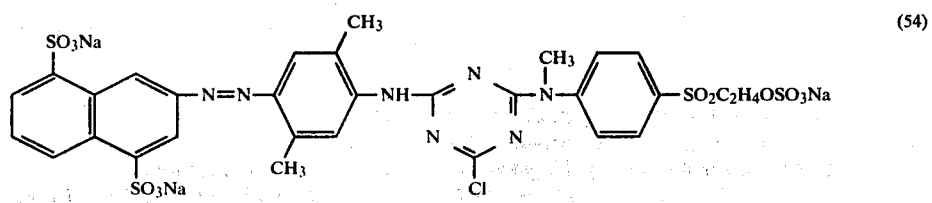

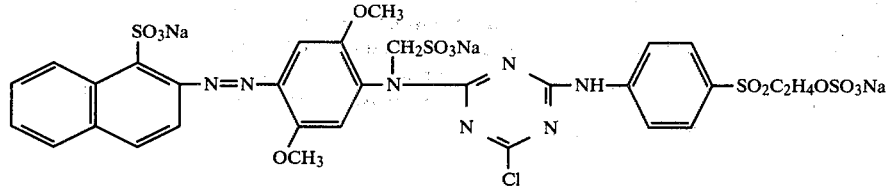

(55)

yellow dyed fabrics were obtained with excellent color fastness to hypochlorite.

EXAMPLE 14-(b)

EXAMPLE 15

0.3 Part of a dye represented by the following formula (56):

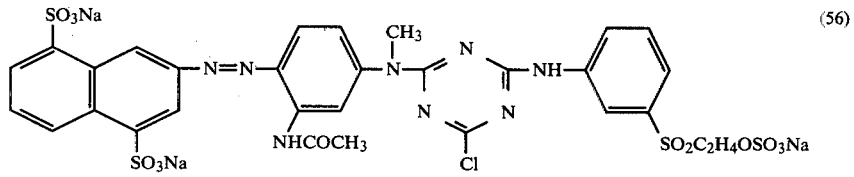

($\lambda_{max}$ 387 nm)

(Synthesis of the dye (52) of Example 14-(a))

The same synthesizing process as Example 1-(b) was repeated except that 3.0 parts of 2-methoxy-5-methyl-N-methylaniline instead of 2.1 parts of m-toluidine and 4.0 parts of 1-aminobenzene-3-β-hydroxyethylsulfone instead of 5.6 parts of 1-aminobenzene-3-β-hydroxyethylsulfonesulfuric ester were used respectively. Monochlorotriazinyl compound obtained was dissolved in 100 parts of 100% sulfuric acid at 20°–30° C. After stirring at the same temperature for 2 hours, the solution was poured in 200 parts of ice. 20 Parts of sodium chloride were added thereto to precipitate crystals. The crystals were collected by filtration, added into 200 parts of water and dissolved by adjusting to pH 5–6 with sodium carbonate. The crystals were reprecipitated therefrom by adding 30 parts of sodium chloride, collected by suction filtration, washed and dried at 60° C. to obtain the dye (52).

were dissolved in 200 parts of water and this solution was supplied with 20 parts of Glauber's salt and 10 parts of cotton and then heated to 60° C., and 20 minutes thereafter, 3 parts of sodium tertiary phosphate were further added. Dyeing was performed at said temperature for one hour, followed by washing with water and soaping to obtain a yellow dyed fabric with excellent color fastness properties, especially color fastness to hypochlorite (4th grade, ISO standard).

Similar dyeing operation using the dyes (57), (58) and (59) of the following formulae produced the yellow dyed fabrics with excellent color fastness to hypochlorite.

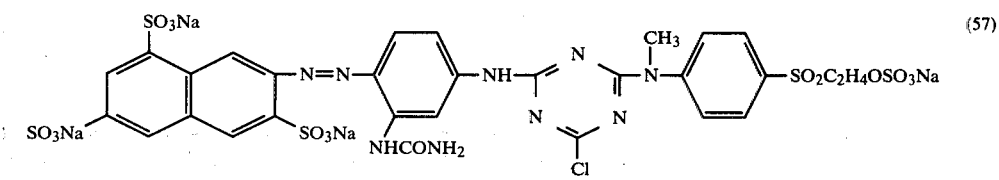

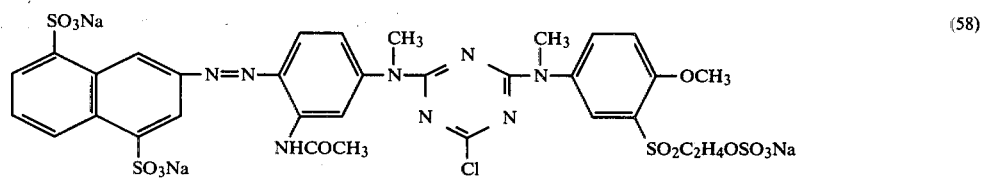

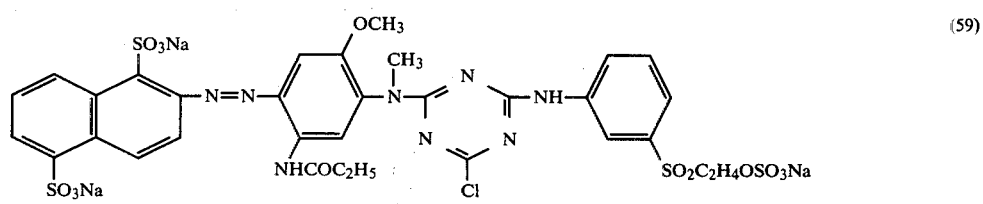

What is claimed is:

1. A compound of the formula, in the form of free acid,

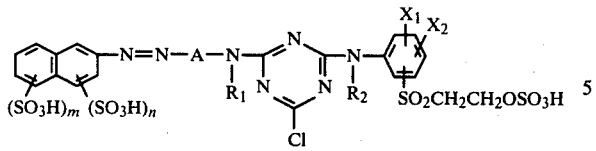

wherein A is

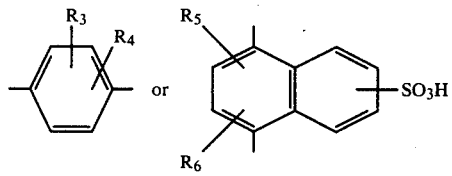

(wherein $R_3$ and $R_4$ are each hydrogen or methyl, ethyl, methoxy, ethoxy, acetylamino, propionylamino, benzoylamino or ureido, and $R_5$ and $R_6$ are each hydrogen, group methyl or methoxy group), $R_1$ and $R_2$ are each hydrogen or methyl, ethyl or sulfomethyl, $X_1$ and $X_2$ are each hydrogen, chlorine or methyl, methoxy, carboxyl or sulfonic acid, m is a number of 0, 1 or 2, and n is a number of 1 or 2, provided that the sum of m and n is 1, 2 or 3.

2. A compound of the formula, in the form of free acid,

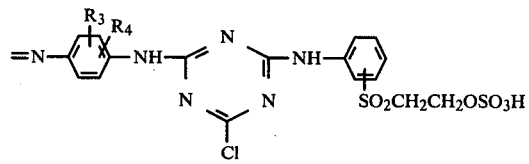

wherein $R_3$ and $R_4$ are each hydrogen or methyl, ethyl, methoxy, ethoxy, acetylamino, propionylamino, benzoylamino or ureido, m is a number of 0, 1 or 2, and n is a number of 1 or 2, provided that the sum of m and n is 1, 2 or 3.

3. A compound of the formula,

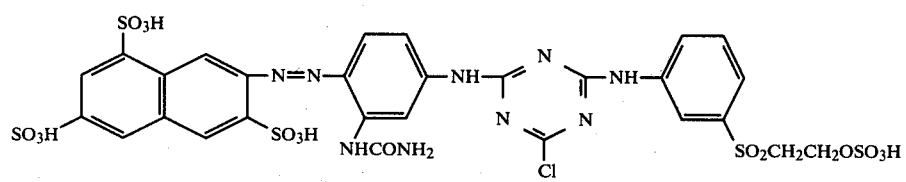

4. A compound of the formula,

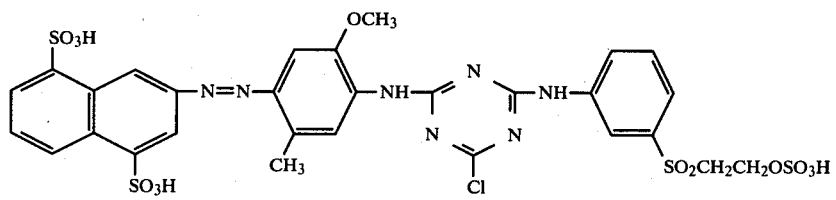

5. A compound of the formula,

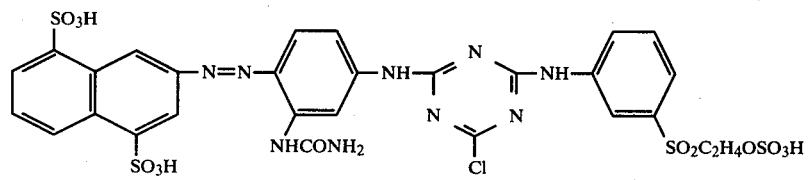

UNITED STATES PATENT AND TRADEMARK OFFICE
CERTIFICATE OF CORRECTION

PATENT NO. : B1 4,378,313
DATED : May 3, 1994
INVENTOR(S) : Yutaka KAYANE et al

It is certified that error appears in the above-indentified patent and that said Letters Patent is hereby corrected as shown below:

Column 2, line 39 (penultimate line of Claim 6), change "$R_2$" to --$R_4$--.

Signed and Sealed this

Fifteenth Day of November, 1994

Attest:

BRUCE LEHMAN

*Attesting Officer*    *Commissioner of Patents and Trademarks*

REEXAMINATION CERTIFICATE (2287th)
United States Patent [19]
Kayane et al.

[11] B1 4,378,313
[45] Certificate Issued May 3, 1994

[54] REACTIVE YELLOW DYE HAVING BOTH MONOCHLOROTRIAZINYL AND VINYLSULFONE TYPE REACTIVE GROUPS

[75] Inventors: Yutaka Kayane, Moriguchi; Masaki Sunami, Toyonaka; Yasuo Tezuka, Ibaraki, all of Japan

[73] Assignee: Sumitomo Chemical Company, Limited, Osaka, Japan

Reexamination Request:
No. 90/002,996, Mar. 10, 1993

Reexamination Certificate for:
Patent No.: 4,378,313
Issued: Mar. 29, 1983
Appl. No.: 153,633
Filed: May 27, 1980

[30] Foreign Application Priority Data

Jun. 1, 1979 [JP] Japan .................. 54-69127
Jul. 11, 1979 [JP] Japan .................. 54-88502
Dec. 20, 1979 [JP] Japan .................. 54-166705
Dec. 20, 1979 [JP] Japan .................. 54-166706

[51] Int. Cl.⁵ ............ C09B 62/08; C09B 62/51; D06P 1/382; D06P 3/66
[52] U.S. Cl. ................... 534/638; 534/617; 534/642
[58] Field of Search .............. 534/638, 617, 642

[56] References Cited

U.S. PATENT DOCUMENTS

2,945,022  7/1960  Fasciati et al. ............ 534/638 X
3,223,470 12/1965  Boedeker et al. .......... 534/638 X

FOREIGN PATENT DOCUMENTS

2614550  of 1977  Fed. Rep. of Germany ...... 534/638
35-10628 of 1960  Japan .................. 534/638
46-2287 10/1971  Japan .................. 534/638
52-77128  6/1977  Japan .................. 534/638
995502   6/1965  United Kingdom .......... 534/638
1351385  4/1974  United Kingdom .......... 534/638
1536706 12/1978  United Kingdom .......... 534/638
2026527  2/1980  United Kingdom .......... 534/638

OTHER PUBLICATIONS

Science & Industry (Kagaku To Kogyo), 42, No. 11, (Nov. 1968), pp. 583–594, "Reactive Dyes Containing Two Kinds of Reactive Groups".
Colour Index, 3rd Ed., vol. 4, (1971) pp. 4048–4049, CI Reactive Yellows 3 and 4.

*Primary Examiner*—Floyd D. Higel

[57] ABSTRACT

The compounds represented, in the form of free acid, by the following general formula (I):

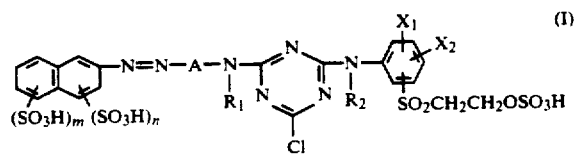

(wherein A is

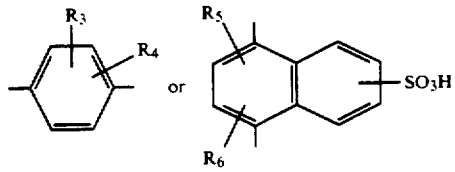

(wherein $R_3$ and $R_4$ are each hydrogen or a methyl, ethyl, methoxy, ethoxy, acetylamino, propionylamino, benzoylamino or ureido group, and $R_5$ and $R_6$ are each hydrogen or a methyl or methoxy group), $R_1$ and $R_2$ are each hydrogen or a methyl, ethyl or sulfomethyl group, $X_1$ and $X_2$ are each hydrogen, chlorine or a methyl, methoxy, carboxyl or sulfonic acid group, m is a number of 0, 1 or 2, and n is a number of 1 or 2, provided that the sum of m and n is 1, 2 or 3).

These compounds are capable of dyeing cellulose fibers in yellow with excellent color fastness to hypochlorite, light, perspiration and sunlight and high acid stability.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 to 5 is confirmed.

Claims 1 and 2 are cancelled.

New claim 6 is added and determined to be patentable.

6. *A compound of the formula, in the form of free acid,*

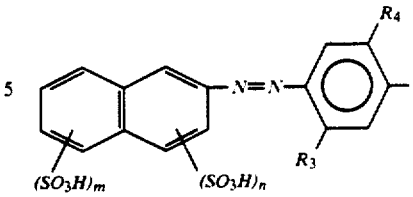

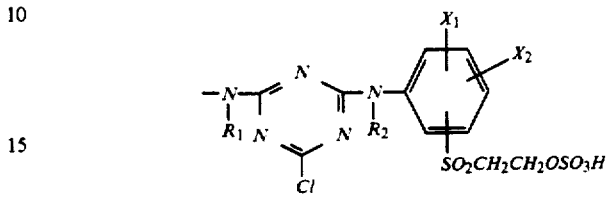

*wherein*
*$R_1$, and $X_1$ and $X_2$ are hydrogen;*
*$R_2$ is hydrogen;*
*the residue of the formula,*

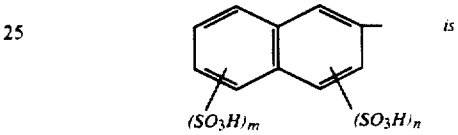

*is*

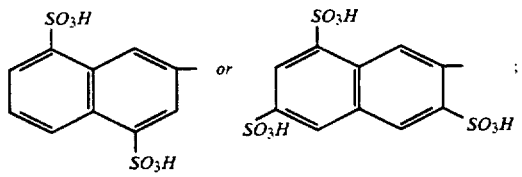

*$R_3$ is methyl, acetylamino or ureido; and*
*$R_2$ is hydrogen or methoxy;*
*provided that $R_4$ is methoxy when $R_3$ is methyl.*

* * * * *